United States Patent [19]

Schmidt et al.

[11] 4,359,120

[45] Nov. 16, 1982

[54] PASSENGER MOTOR VEHICLE WITH YIELDING BODY FRONT SECTIONS

[75] Inventors: Willi Schmidt, Herrenber; Norbert Schwuchow; Gerhard Burk, both of Sindelfingen, all of Fed. Rep. of Germany

[73] Assignee: Daimler-Benz A.G., Stuttgart, Fed. Rep. of Germany

[21] Appl. No.: 180,639

[22] Filed: Aug. 25, 1980

[30] Foreign Application Priority Data

Aug. 23, 1979 [DE] Fed. Rep. of Germany ....... 2934060

[51] Int. Cl.³ ............................................. B60R 21/14
[52] U.S. Cl. .................................. 180/69 R; 296/189
[58] Field of Search ................... 180/271, 274, 69 R, 180/69 C; 296/189; 293/15, 38

[56] References Cited

U.S. PATENT DOCUMENTS

| 1,232,835 | 7/1917 | Ostrowiecki | 293/38 |
| 1,333,797 | 3/1920 | Lorenzo | 293/15 |
| 1,748,371 | 2/1930 | Trieschmann | 293/15 |
| 3,751,090 | 8/1973 | Wakabayashi et al. | 293/38 |
| 3,909,058 | 9/1975 | Krämer et al. | 180/69 C X |
| 4,093,290 | 6/1978 | Pearson | 293/15 |
| 4,249,632 | 2/1981 | Lucchini et al. | 180/274 |

FOREIGN PATENT DOCUMENTS

2711339  9/1978  Fed. Rep. of Germany .

*Primary Examiner*—Joseph F. Peters, Jr.
*Assistant Examiner*—Michael Mar
*Attorney, Agent, or Firm*—Paul M. Craig, Jr.

[57] ABSTRACT

An automotive vehicle, especially a passenger motor vehicle, with front body sections yielding with respect to forces of a magnitude of a pedestrian impact acting from the front and/or from above the body sections. The body sections are constructed so as to be impact-resilient along their boundary edges. The vehicle body sections include a front hood and/or body portions surrounding the front hood, with the hood and surrounding body parts being supported on reinforcing parts of the vehicle body structure by way of permanently deformable deformation members.

11 Claims, 3 Drawing Figures

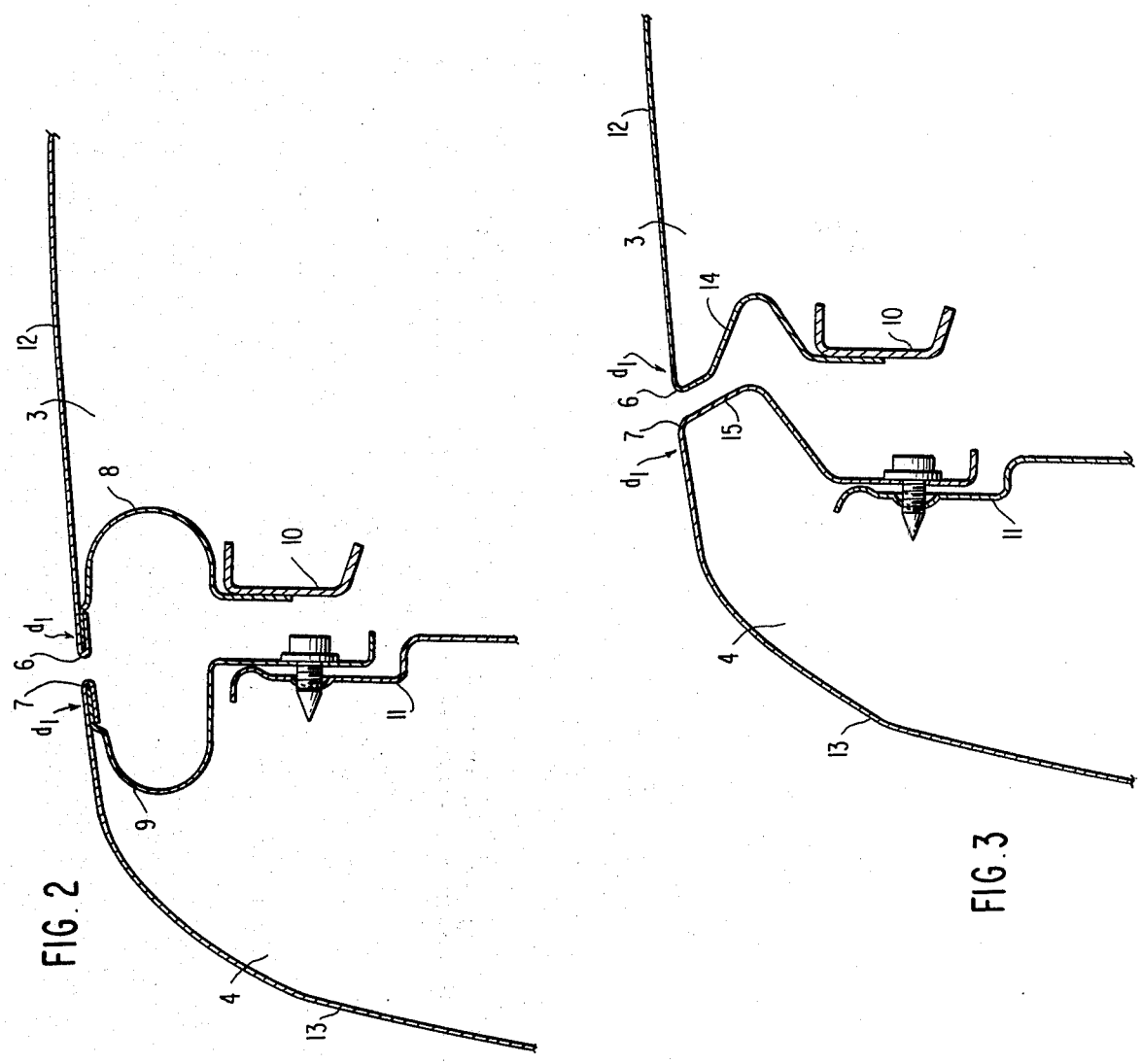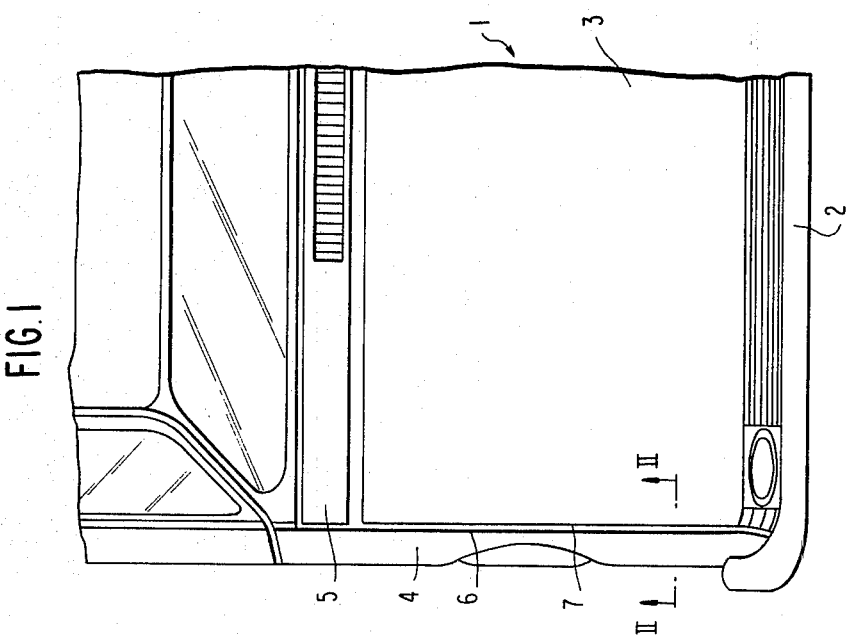

PASSENGER MOTOR VEHICLE WITH YIELDING BODY FRONT SECTIONS

The present invention relates to a motor vehicle and, more particularly, to a passenger motor vehicle which is provided with front body sections adapted to yield in response to forces of the magnitude generated by a pedestrian impact acting to the front and/or from above the body sections, which sections are constructed to be impact resilient along their boundary edges.

During a collision of an automotive vehicle with a pedestrian, in an initial phase a pedestrian is seized by the bumper and, during a second phase, the pedestrian collides with an upper part of the body and head on the front of the hood and body front section surrounding the hood such as, for example, the fenders and cowl panel.

To mitigate injuries to pedestrians which particularly occur during an impact in the second phase, various proposals have been advanced. For example, in Auslegeschrift No. 2,711,339, a pedestrian impact protection device for a motor vehicle is proposed wherein the bearing portions of the front hood are fashioned so as to be yielding with respect to forces at least of the magnitude of those generated by a pedestrian impacting on the hood from the front of the vehicle and/or from above the vehicle. Moreover, the front hood for the automobile in this proposed arrangement is of a low mass and is impact resilient along a rim of the hood. The impact resilient construction is achieved by a selection of large radii of curvature of the outer panel in the marginal zone of the curved frontal hood and by arranging reinforcing ribs remotely from the edge.

Additionally, in the above-noted proposed impact protection device, the suggestion is also made to additionally arrange yielding intermediate layers between the rim of the hood and lateral body sections covered by the curved frontal hood, which layers are provided so as to ensure a vibration-resistant contact without impairing the desired and necessary yieldability.

The aim underlying the present invention essentially resides in providing an automotive vehicle provided with front body sections which minimize injuries to pedestrians impacting upon the front body sections.

In accordance with advantageous features of the present invention, the front hood and/or body parts surrounding the hood are supported on reinforcing portions of the vehicle body structure by way of permanently deformable deformation members.

By virtue of the above noted features of the present invention, the front hood, the fenders, and the cowl panel may be supported on the reinforcing parts of the frontal hood and the vehicle body structure by way of profiled permanently deformable deformation members consisting of, for example, sheet metal. By the arrangement of permanently deformable deformation members between the boundaries of the outer panels of the body frame sections and the supporting reinforcement parts of the vehicle body structure, the forces effective during a collision are uniformly distributed all over the zone also to the otherwise more rigid boundary zones so that injury causing loads upon impact of the pedestrian involved in a collision are considerably reduced in this zone.

Moreover, by virtue of the features of the present invention, it is possible to attain a relatively accurately defined rigidity by a corresponding design of the deformation members and by an appropriate choice of the hardness of the material for the deformation members.

In accordance with further advantageous features of the present invention, the deformation members may be constituted by inwardly curved border zones of the front hood and/or fender or fenders. By means of this connection of the outer panels with the supporting parts of the vehicle body structure, provided by an appropriate styling for the motor vehicle, an energy absorbing deformation zone is created by means of which the acting forces during a collision are likewise distributed uniformally all over the zones including the otherwise more rigid border zones and are reduced to a much more tolerable level.

In accordance with the present invention, mutually adjoining body sections may be supported against the respective reinforcing parts of the vehicle body structure in a zone of their borders, mutually opposed in the same plane, by way of permanently deformable deformation members.

Accordingly, it is an object of the present invention to provide a passenger motor vehicle provided with front body portions yieldable to forces of a magnitude equal to a pedestrian impacting thereon, which avoids by simple means, shortcomings and disadvantages encountered in the prior art.

Another object of the present invention resides in providing a passenger motor vehicle with yieldable front body portions which minimizes the injuries to pedestrians.

Yet another object of the present invention resides in providing a passenger motor vehicle with yieldable front body portions which enables the attainment of a relatively accurately defined rigidity for the front body parts.

A further object of the present invention resides in providing a passenger motor vehicle provided with yieldable front body portions which ensures a uniform distribution of impact forces occurring during a collision throughout the entire front section of the motor vehicle.

These and other objects, features, and advantages of the present invention will become more apparent from the following description when taken in connection with the accompanying drawings which show, for the purposes of illustration only, two embodiments in accordance with the present invention, and wherein:

FIG. 1 is a top fragmentary view of a front region of a passenger motor vehicle provided with a front hood and fender which are resilient and yieldable in case of an impact acting from above in accordance with the present invention;

FIG. 2 is a cross sectional view taken along the line II—II in FIG. 1 illustrating a first embodiment of a deformable support for the front body parts in accordance with the present invention; and FIG. 3 is a cross sectional view also taken along the line II—II in FIG. 1 of a second embodiment in accordance with the present invention.

Referring now to the drawings wherein like reference numerals are used throughout the various views to designate like parts and, more particularly, to FIG. 1, according to this figure, a passenger motor vehicle generally designated by the reference numeral 1 includes a front hood 3 and a bumper 2 with, for example, fenders 4 and a cowl panel 5 surrounding the frontal body parts of the motor vehicle 1. Upon a collision of the motor vehicle 1 with a pedestrian, the pedestrian is initially seized in the leg zone by the bumper 2 and then hurled onto the front hood 3 and the surrounding frontal body parts with the upper part of the body and head of the pedestrian colliding with these locations.

As shown in FIGS. 2 and 3, under the forces effective during the collision of the passenger motor vehicle 1 with the pedestrian, a downwardly oriented deformation $d_1$ occurs on the frontal hood 3, fenders 4, and cowl panel 5 in the frontal zone of the motor vehicle 1. To mitigate the injuries inflicted upon the pedestrian especially in the zone of the boundaries 6, 7 of the front hood and fenders 4, which lie in mutual opposition in one plane, which boundaries are normally constructed to be substantially more rigid than the remaining surfaces of the hood 3 and fenders 4, the boundaries 6, 7 of the front hood and fenders 4 are supported by way of profiled energy absorbing deformation members 8, 9 formed of, for example, sheet metal, with the deformation members supporting the hood 3 and fender 4 on supporting reinforcement parts 10, 11 of the hood 3 and vehicle body structure.

Due to their arrangement, the deformation body members 8 make it possible for the otherwise more rigid border zones of the outer panels 12, 13 of the front hood and fenders 4 to execute a deformation displacement whereby the injury provoking loads which occur during impact of the pedestrian during a collision are reduced in this zone.

As shown in FIG. 2, one arcuately bent deformation member 8, 9 is respectively mounted in a beaded or seamed boundary 6, 7 of the outer panel 12 of the front hood 3 and the outer panel 13 of the fender 4. The respective deformation members 8, 9 are arranged with the other end thereof at the supporting reinforcement sections 10, 11 of the front hood 3 and fender 4. By a deformation of the arcuately bent deformation members 8, 9, which are provided with a correspondingly defined rigidity, the forces acting during a collision are absorbed and reduced to a tolerable level.

As illustrated in FIG. 3, the deformation members may be formed by inwardly curved border zones 14, 15 of the front hood 3 and fender 4, with the border zones 14, 15 being attached at their free ends to supporting reinforcing parts 10, 11 of the front hood and the vehicle body structure.

A relatively exactly defined rigidity of the inwardly curved border zones 14, 15 may be achieved by a profiled styling with correspondingly obliquely oriented surfaces in the construction of FIG. 3. By virtue of the construction of the border zones 14, 15 of the outer panels 12, 13 associated respectively with the front hood and fenders 4 in accordance with the present invention, increased deformation displacements of the otherwise more rigid border zones of these parts result so that injury causing loads during an impact of the pedestrian involved in a collision are likewise lowered in the otherwise more rigid border zones.

While we have shown and described only two embodiments in accordance with the present invention, it is understood that the same is not limited thereto but is susceptible of numerous changes and modifications as known to one having ordinary skill in the art, and we therefore do not with to be limited to the details shown and described herein, but intend to cover all such modifications as are encompassed by the scope of the appended claims.

We claim:

1. A passenger motor vehicle which includes front vehicle body sections adapted to yield to forces of a magnitude equal to that of impact forces of a pedestrian striking from at least one of the front and from above the respective body sections, characterized in that permanently deformable deformation means are provided for supporting the front vehicle body sections on reinforcing parts of the motor vehicle, said deformation means are adapted to become permanently deformable prior to deformation of the body section under low impact forces of the pedestrian striking the body sections thereby enabling the body sections supported by the deformation means to execute a deformation displacement so as to reduce injury to the pedestrian in an impact zone of the body sections.

2. A passenger motor vehicle according to claim 1, characterized in that the front vehicle body sections are constructed so as to be impact resilient at least along boundary edges separating the body sections.

3. A passenger motor vehicle according to claim 2, characterized in that the front body sections include a vehicle hood and body parts surrounding said vehicle body.

4. A passenger motor vehicle according to claim 3, characterized in that said body parts surrounding said vehicle hood include a fender provided on respective sides of the vehicle hood.

5. A passenger motor vehicle according to claim 4, characterized in that the body parts further include a cowl disposed along a rear edge of the vehicle hood.

6. A passenger motor vehicle according to one of claims 1 or 2, characterized in that the deformation means are arranged so as to support the front vehicle body sections in a position such that edges of the respective body sections lie in mutual opposition to each other in the same plane.

7. A passenger motor vehicle according to claim 6, characterized in that the deformation means are formed as sheet metal members mounted in boundary areas of the respective body sections.

8. A passenger motor vehicle according to claim 7, characterized in that the sheet metal members have an arcuate configuration.

9. A passenger motor vehicle which includes front vehicle body sections adapted to yield to forces of a magnitude equal to that of impact forces of a pedestrian striking from above the respective body sections, characterized in that permanently deformable deformation means are provided for supporting the front vehicle body section on reinforcing parts of the motor vehicle, the front vehicle body sections are constructed to be impact resilient at least along boundary edges separating the body sections said deformation means are adapted to become permanently deformable prior to deformation of the body sections under low impact forces of the pedestrian striking the body sections, thereby enabling the body sections supported by the deformation means to execute a deformation displacement so as to reduce injury to the pedestrian an impact zone of the body sections, the body sections include a vehicle hood, a fender provided on respective sides of the vehicle hood, and a cowl disposed along a rear edge of the vehicle hood, and in that the deformation means are formed by inwardly bent portions of the hood, fender, and cowl and are located in an area of a boundary between the respective body sections.

10. A passenger motor vehicle which includes front vehicle body sections adapted to yield to forces of a magnitude equal to that of impact forces of a pedestrian striking from above the respective body section, characterized in that permanently deformable deformation means are provided for supporting the front vehicle body section on reinforcing parts of the motor vehicle said deformation means are adapted to become permanently deformable prior to deformation of the body sections under low impact forces of the pedestrian striking the body sections, thereby enabling the body sections supported by the deformation means to execute a deformation displacement so as to reduce injury to the pedestrian in an impact zone of the body sections, the deformation means are formed by inwardly bent portions of the respective vehicle body.

11. A passenger motor vehicle according to claim 10, characterized in that the front vehicle body sections are constructed so as to be impact resilient at least along boundary edges separating the body sections.

* * * * *